US008571141B2

(12) United States Patent  
Cheng et al.

(10) Patent No.: US 8,571,141 B2
(45) Date of Patent: Oct. 29, 2013

(54) CARRIER RECOVERY DEVICE AND METHOD

(75) Inventors: Kuang-Peng Cheng, Taipei (TW); Ming-Chang Chen, Kaohsiung County (TW)

(73) Assignee: Realtek Semiconductor Corp., Hsinchu (TW)

(*) Notice: Subject to any disclaimer, the term of this patent is extended or adjusted under 35 U.S.C. 154(b) by 579 days.

(21) Appl. No.: 12/793,432

(22) Filed: Jun. 3, 2010

(65) Prior Publication Data

US 2010/0310014 A1 Dec. 9, 2010

(30) Foreign Application Priority Data

Jun. 3, 2009 (TW) ................................ 98118397 A

(51) Int. Cl.
*H04L 27/22* (2006.01)
(52) U.S. Cl.
USPC ............................ 375/326; 375/321; 375/316
(58) Field of Classification Search
USPC .................................................. 375/226, 326
See application file for complete search history.

(56) References Cited

U.S. PATENT DOCUMENTS

| 3,659,224 | A | * | 4/1972 | Ball | 331/111 |
| 5,304,957 | A | * | 4/1994 | Edwards | 331/12 |
| 6,259,755 | B1 | * | 7/2001 | O'Sullivan et al. | 375/376 |
| 6,418,164 | B1 | * | 7/2002 | Endres et al. | 375/232 |
| 6,671,339 | B1 | * | 12/2003 | Ahn | 375/346 |
| 7,027,500 | B1 | * | 4/2006 | Casas et al. | 375/232 |
| 7,480,350 | B2 | * | 1/2009 | Kim et al. | 375/326 |
| 7,567,298 | B2 | * | 7/2009 | Markman et al. | 348/607 |
| 7,680,234 | B2 | * | 3/2010 | Colby et al. | 375/376 |
| 8,031,813 | B2 | * | 10/2011 | Kim et al. | 375/326 |
| 2004/0021489 | A1 | * | 2/2004 | Okui | 327/141 |
| 2005/0187752 | A1 | * | 8/2005 | Colby et al. | 703/19 |
| 2006/0176783 | A1 | * | 8/2006 | Sergey et al. | 369/44.13 |
| 2007/0001722 | A1 | * | 1/2007 | Young et al. | 327/156 |

(Continued)

FOREIGN PATENT DOCUMENTS

| CN | 1464708 A | 12/2003 |
| CN | 1466345 A | 1/2004 |
| CN | 1822586 A | 8/2006 |

OTHER PUBLICATIONS

English Abstract for CN 1464708A (Dec. 31, 2003).

(Continued)

*Primary Examiner* — Chieh M Fan
*Assistant Examiner* — Santiago Garica
(74) *Attorney, Agent, or Firm* — McClure, Qualey & Rodack, LLP

(57) ABSTRACT

A carrier recovery device and a carrier recovery method are provided. The device includes a phase detection module, a computation module, a phase angle adjustment module, a loop filter, and a conversion module. The phase detection module receives an IF signal, and detects a sine and a cosine signals corresponding to the IF signal. The computation module receives the sine and the cosine signals, and computes a phase angle between the sine and the cosine signals. The phase angle adjustment module adjusts the phase angle according to one of the sine and the cosine signals and a threshold. The loop filter generates a frequency offset angle according to the phase angle. The conversion module generates a sine and a cosine parameters according to the frequency offset angle, and transfers the sine and the cosine parameters to the phase detection module.

18 Claims, 4 Drawing Sheets

(56) References Cited

U.S. PATENT DOCUMENTS

2007/0189195 A1* 8/2007 Belotserkovsky ............ 370/315
2008/0220733 A1* 9/2008 McCune ....................... 455/118
2008/0285640 A1* 11/2008 McCallister et al. ......... 375/233
2010/0283918 A1* 11/2010 Zhang .......................... 348/735
2010/0296615 A1* 11/2010 Wei ............................... 375/376

OTHER PUBLICATIONS

English Abstract for CN 1466345A (Jan. 7, 2004).
English Abstract for CN 1822586A (Aug. 23, 2006).

* cited by examiner

CARRIER RECOVERY DEVICE AND METHOD

CROSS-REFERENCES TO RELATED APPLICATIONS

This non-provisional application claims priority under 35 U.S.C. §119(a) on Patent Application No. 98118397 filed in Taiwan, R.O.C. on Jun. 3, 2009, the entire contents of which are hereby incorporated by reference.

BACKGROUND

1. Technical Field

The disclosure relates to a carrier recovery device and a carrier recovery method, and more particularly to a carrier recovery device and a carrier recovery method under a low carrier wave.

2. Related Art

Carrier waves may be applied in various different fields, for example television signal transmission, transmission of speech signals in communication, etc. When the data to be sent has a low frequency, the transmission is easily interfered if the data is sent at the original data frequency, which is disadvantageous for reception. At this time, the data may be transmitted using a carrier wave. First, a signal of the data is loaded in a signal of the carrier wave; then, a receiving end receives the data signal at a frequency of the carrier wave; finally, the received carrier wave signal is demodulated to obtain the original data signal.

In brief, the carrier wave is a technology for assisting signal propagation, which may adjust a signal to a frequency many times higher than that of the original signal, so that the transmission of the signal is not easily interfered with. Afterwards, once the carrier wave signal is received, the carrier wave is removed so as to restore the original signal.

For example, when receiving conventional television signals from a cable or wireless television station, the television signals have frequencies ranging from 40 MHz to 900 MHz; specifically, the television signals firstly pass through tuners to output intermediate frequency (IF) signals having a frequency of 38 MHz, 38.9 MHz, or 45.75 MHz; then, the IF signals are demodulated according to settings of the turners to generate baseband signals, so as to provide correct pictures and audio signals for being viewed by users.

During this process of demodulation, carrier recovery must be performed on the IF signals at the receiving end, so as to generate a stable demodulated wave that is not easily interfered with. However, conventionally, if the carrier wave intensity of the signal is rather low the carrier recovery tends to be unstable, thereby causing incorrect pictures and sounds.

SUMMARY

In view of the above problem, the disclosure is directed to a carrier recovery device and a carrier recovery method, which are applicable to accomplish carrier recovery effectively. Even if the IF signal has a low strength, i.e., a low carrier wave, the carrier recovery can be successfully accomplished through the device or method in the disclosure, thereby improving the loop stability required for demodulation.

The disclosure provides a carrier recovery device, which includes a phase detection module, a computation module, a phase angle adjustment module, a loop filter, and a conversion module. The phase detection module receives an IF signal, and detects a sine signal and a cosine signal corresponding to the IF signal. The computation module is coupled to the phase detection module, receives the sine signal and the cosine signal, and computes a phase angle between the sine signal and the cosine signal. The phase angle adjustment module is coupled to the phase detection module and the computation module, and controls whether to reduce the phase angle according to one of the sine signal and the cosine signal and a threshold. The loop filter is coupled to the computation module, and generates a frequency offset angle according to the phase angle. The conversion module is coupled to the loop filter and the phase detection module, generates a sine parameter and a cosine parameter corresponding to the frequency offset angle according to the frequency offset angle, and transfers the sine parameter and the cosine parameter to the phase detection module, so as to adjust the sine signal and the cosine signal respectively.

The disclosure also provides a carrier recovery method, which includes the following steps: receiving an IF signal, and detecting a sine signal and a cosine signal corresponding to the IF signal; computing a phase angle between the sine signal and the cosine signal; adjusting the phase angle according to one of the sine signal and the cosine signal and a threshold; generating a frequency offset angle according to the phase angle; generating a sine parameter and a cosine parameter corresponding to the frequency offset angle according to the frequency offset angle; and adjusting the sine signal and the cosine signal respectively by using the sine parameter and the cosine parameter.

The preferred embodiments and efficacies of the disclosure are illustrated below with reference to the drawings.

DETAILED DESCRIPTION

Figure 1:
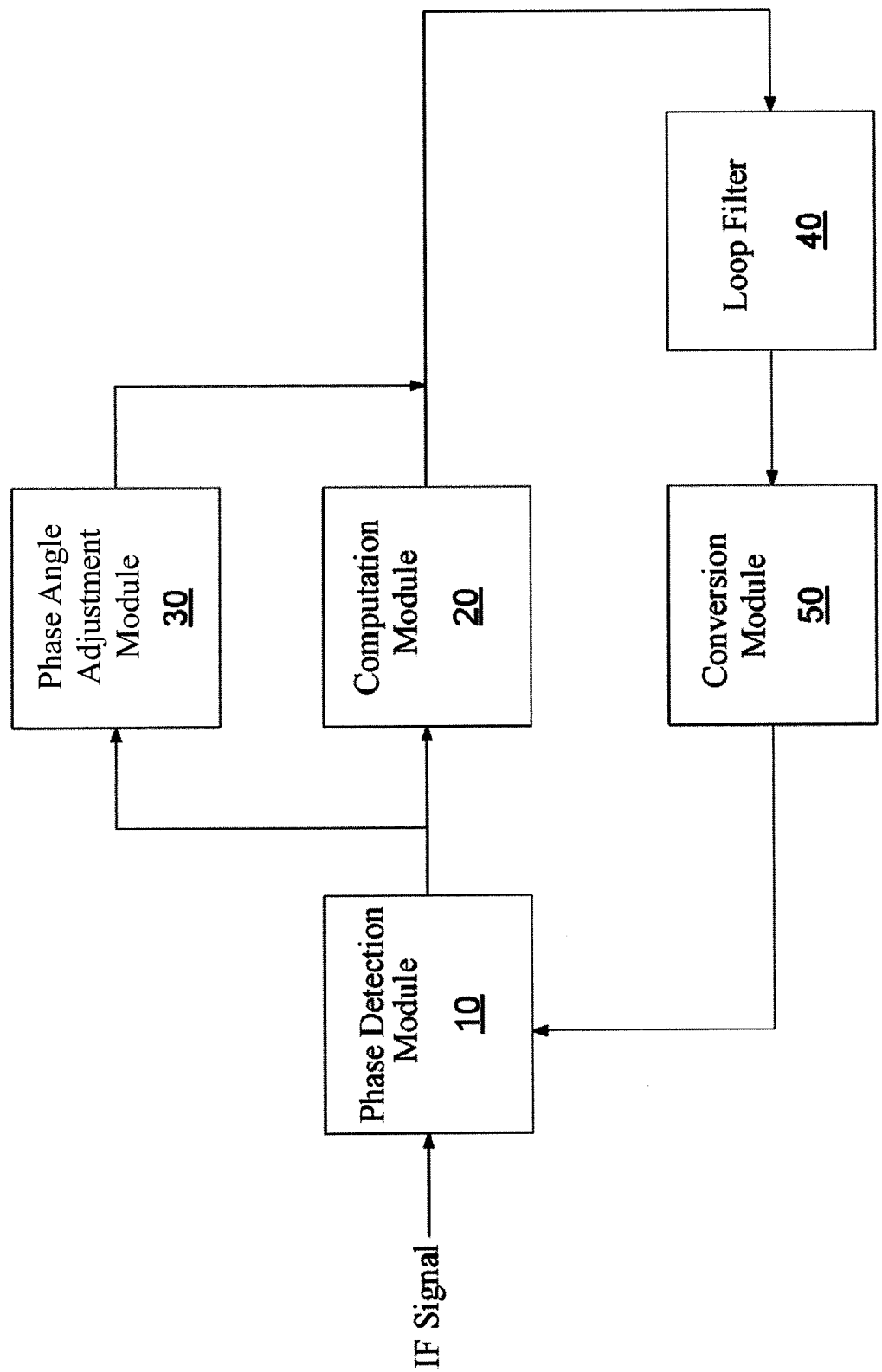
FIG. 1 is a schematic view of a carrier recovery device according to a first embodiment.

FIG. 1 is a schematic view of a carrier recovery device according to a first embodiment. Please refer to FIG. 1, the carrier recovery device provided in the disclosure includes a phase detection module 10, a computation module 20, a phase angle adjustment module 30, a loop filter 40, and a conversion module 50.

The phase detection module 10 receives an IF signal. Herein, the IF signal may be provided by a tuner. After receiving the IF signal loaded by the tuner, the phase detection module 10 detects a sine signal and a cosine signal corresponding to the IF signal.

The computation module 20 is coupled to the phase detection module 10, receives the sine signal and the cosine signal, and computes a phase angle between the sine signal and the cosine signal. The computation module 20 may be a coordinate rotation digital computer (CORDIC).

The phase angle adjustment module 30 is coupled to the phase detection module 10 and the computation module 20, and adjusts the phase angle according to one of the sine signal and the cosine signal and a threshold, which will be illustrated later in greater detail.

The loop filter 40 is coupled to the computation module 20, and generates a frequency offset angle according to the phase angle. The loop filter 40 may be a proportional integral (PI)

controller. The conversion module 50 is coupled to the loop filter 40 and the phase detection module 10, generates a sine parameter and a cosine parameter corresponding to the frequency offset angle according to the frequency offset angle, and transfers the sine parameter and the cosine parameter to the phase detection module 10, so as to adjust the sine signal and the cosine signal respectively. The conversion module 50 includes a local oscillator.

The frequency of the IF signal received by the phase detection module 10 does not essentially equal to the frequency of a signal generated by the local oscillator of the conversion module 50. Therefore, after the phase detection module 10 obtains the orthogonal sine signal and cosine signal, the computation module 20 computes the phase angle of the current IF signal, and then through the loop filter 40, the frequency offset angle is obtained by gradual convergence. Here, the frequency offset angle is a phase angle difference between the IF signal and the signal generated by the local oscillator. After the value of the phase angle difference (i.e., the frequency offset angle), is obtained, the conversion module 50 generates the sine parameter and the cosine parameter required for demodulation according to a look up table.

Figure 2:
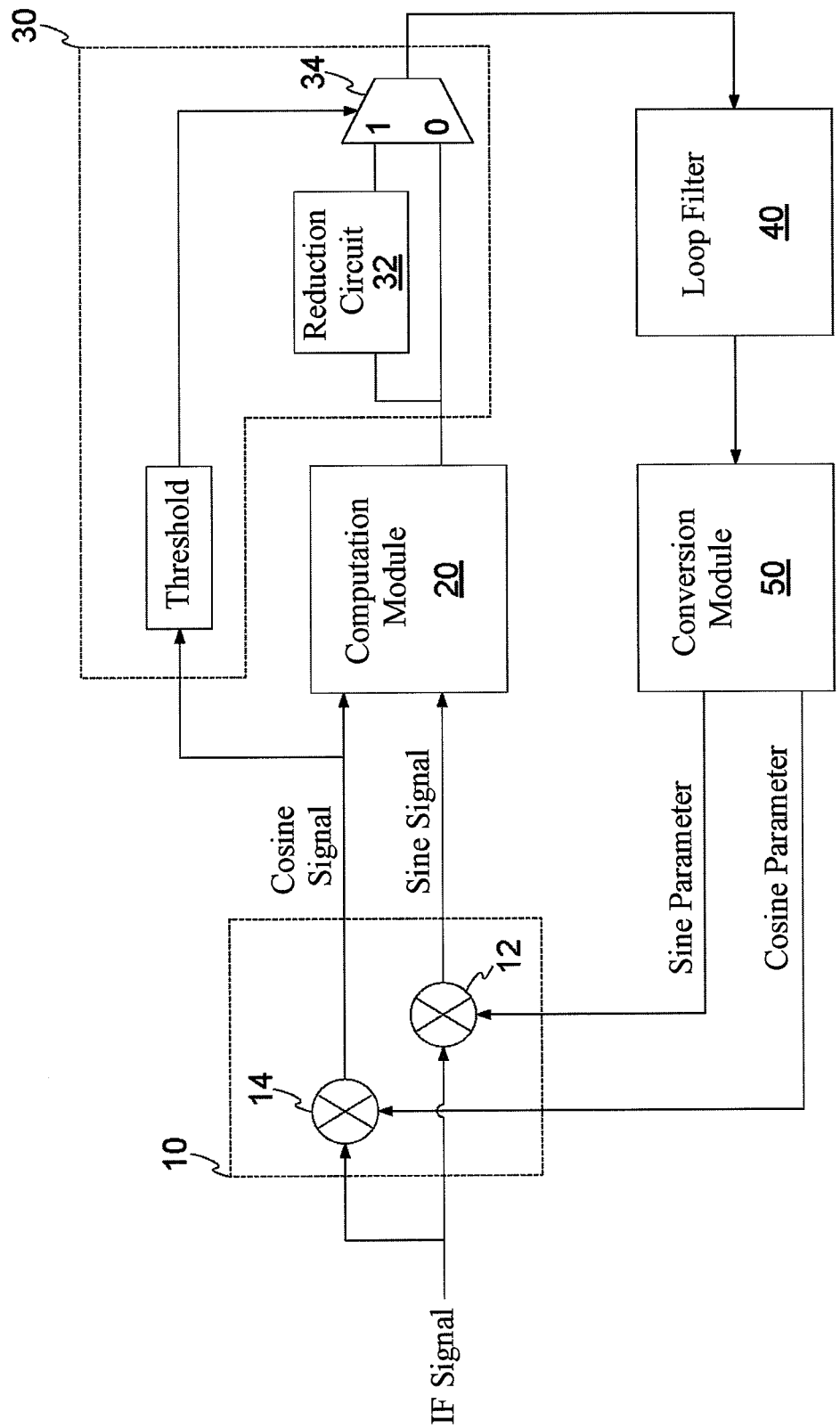
FIG. 2 is a schematic view of a carrier recovery device according to a second embodiment.

FIG. 2 is a schematic view of a carrier recovery device according to a second embodiment. Please refer to FIG. 2, in which embodiment the phase detection module 10 includes a first multiplier 12 and a second multiplier 14. After the conversion module 50 obtains the sine parameter and the cosine parameter according to a look up table, the sine signal may be generated by multiplying the IF signal by the sine parameter through the first multiplier 12, and the cosine signal may be generated by multiplying the IF signal by the cosine parameter through the second multiplier 14. On this basis, the carrier recovery forms a loop, in which the frequency offset angle is generated by the loop filter 40, the sine parameter and the cosine parameter corresponding to the frequency offset angle are generated through the conversion module 50, and the sine signal and the cosine signal are respectively adjusted by using the sine parameter and the cosine parameter, which aims at enabling the phase angle between the sine signal and the cosine signal to be zero, and enabling the frequency of the IF signal to approximately equal to the frequency of the local oscillator. Therefore, the above carrier recovery device is a phase lock loop (PLL).

Conventionally, if the carrier wave of the received IF signal is too small or incurs high interference, the carrier recovery device may have an inaccurate phase, which fails to recover correct pictures or sounds. Accordingly, the disclosure provides a phase angle adjustment module 30. An embodiment of the phase angle adjustment module 30 is shown in FIG. 2. The phase angle adjustment module 30 includes a reduction circuit 32 and a selector 34. The phase angle adjustment module 30 may compare the sine signal or the cosine signal with the threshold, in which the cosine signal is taken as an example for illustration in this embodiment, but the disclosure is not limited here. As known from FIG. 2, the cosine signal is firstly compared with the threshold. If the comparison result is that the cosine signal is smaller than the threshold, it indicates that the IF signal at this time is too small and not suitable for recovery, so that the selector 34 is controlled to select the path "1", that is, the phase angle computed by the computation module 20 is reduced through the reduction circuit 32. In this way, the IF signal that is not suitable for recovery has its phase angle reduced by the reduction circuit 32, which does not influence the convergence adjustment of the subsequent circuit.

On the contrary, after the cosine signal is compared with the threshold, if the comparison result is that the cosine signal is greater than the threshold, it indicates that the IF signal at this time is strong and suitable for recovery, so that the selector 34 is controlled to select the path "0", that is, the phase angle computed by the computation module 20 is directly transferred to the loop filter 40 for the convergence adjustment of the subsequent circuit.

Figure 3:
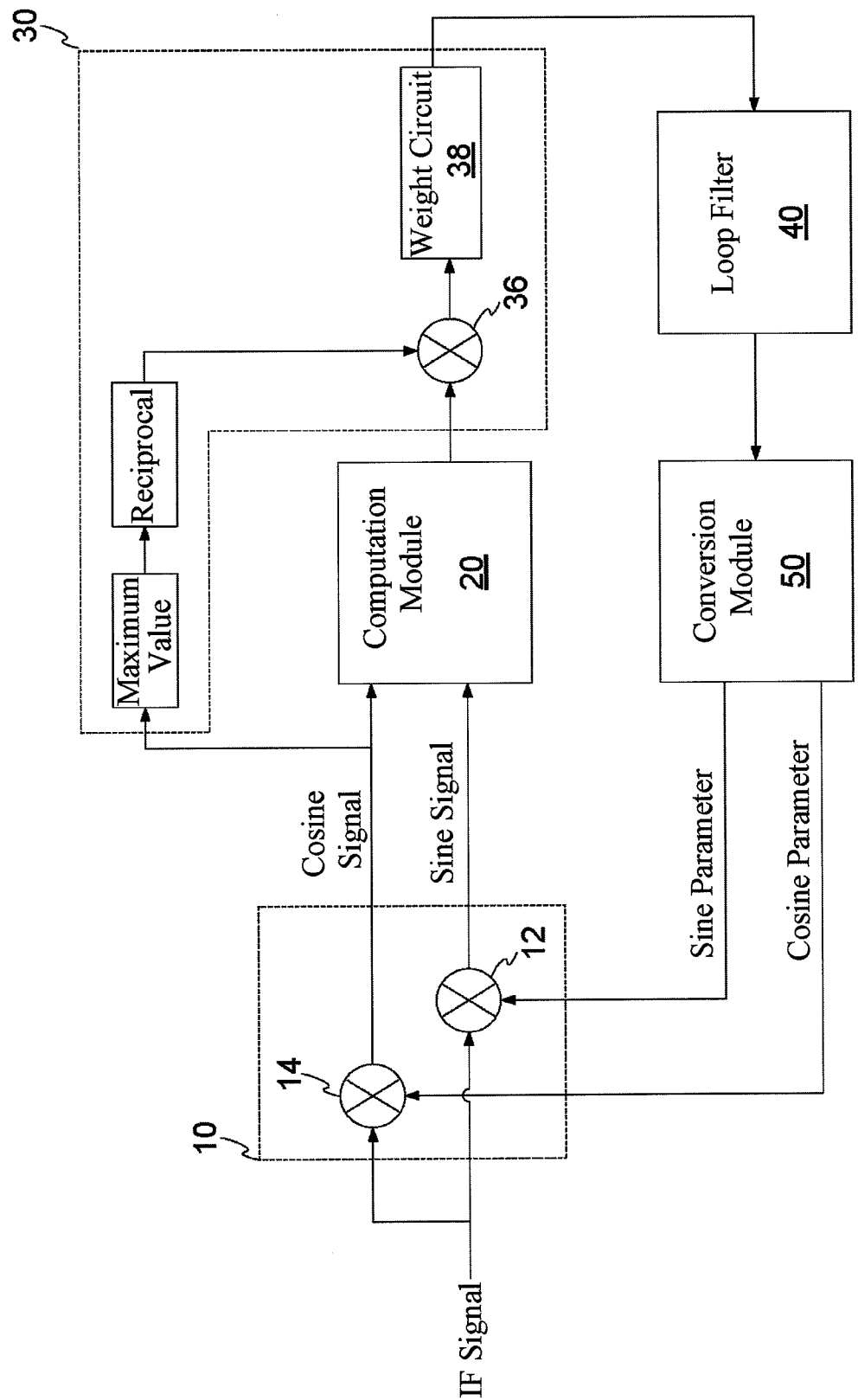
FIG. 3 is a schematic view of a carrier recovery device according to a third embodiment.

FIG. 3 is a schematic view of a carrier recovery device according to a third embodiment. This embodiment illustrates another implementation of the phase angle adjustment module 30. Please refer to FIG. 3, in which the phase angle adjustment module 30 includes a third multiplier 36 and a weight circuit 38.

The phase angle adjustment module 30 firstly computes a maximum value of the sine signal or the cosine signal, in which the cosine signal shown in FIG. 3 is taken as an example, but the disclosure is not limited here. After the maximum value of the cosine signal is obtained, a reciprocal of the maximum value is taken to serve as the threshold. In other words, the threshold is used as a weight, and all the phase angles computed through the computation module 20 need to be multiplied by the threshold through the third multiplier 36, that is, all the phase angles need to be divided by the maximum value of the cosine signal.

If the IF signal at this time is small, it indicates that the phase angle generated at this time is not suitable for making reference, and the phase angle at this time is reduced through multiplication of the third multiplier 36, so that the reduced phase angle does not easily influence the computation of the subsequent circuit. Conversely, if the IF signal at this time is normal, the phase angle still maintains a large value through the multiplication of the third multiplier 36 and thus is provided for the computation of the subsequent circuit, without influencing the operation of the normal loop due to the additional multiplication by the threshold.

In addition, the phase angle adjustment module 30 may further include the weight circuit 38, which is used for additionally providing a weight that re-adjusts a weight value obtained after the computation (multiplying the threshold by the phase angle) of the third multiplier 36. That is to say, the weight circuit 38 can provide an additionally set weight depending upon the demands, thereby enhancing the weight adjustment flexibility.

Figure 4:
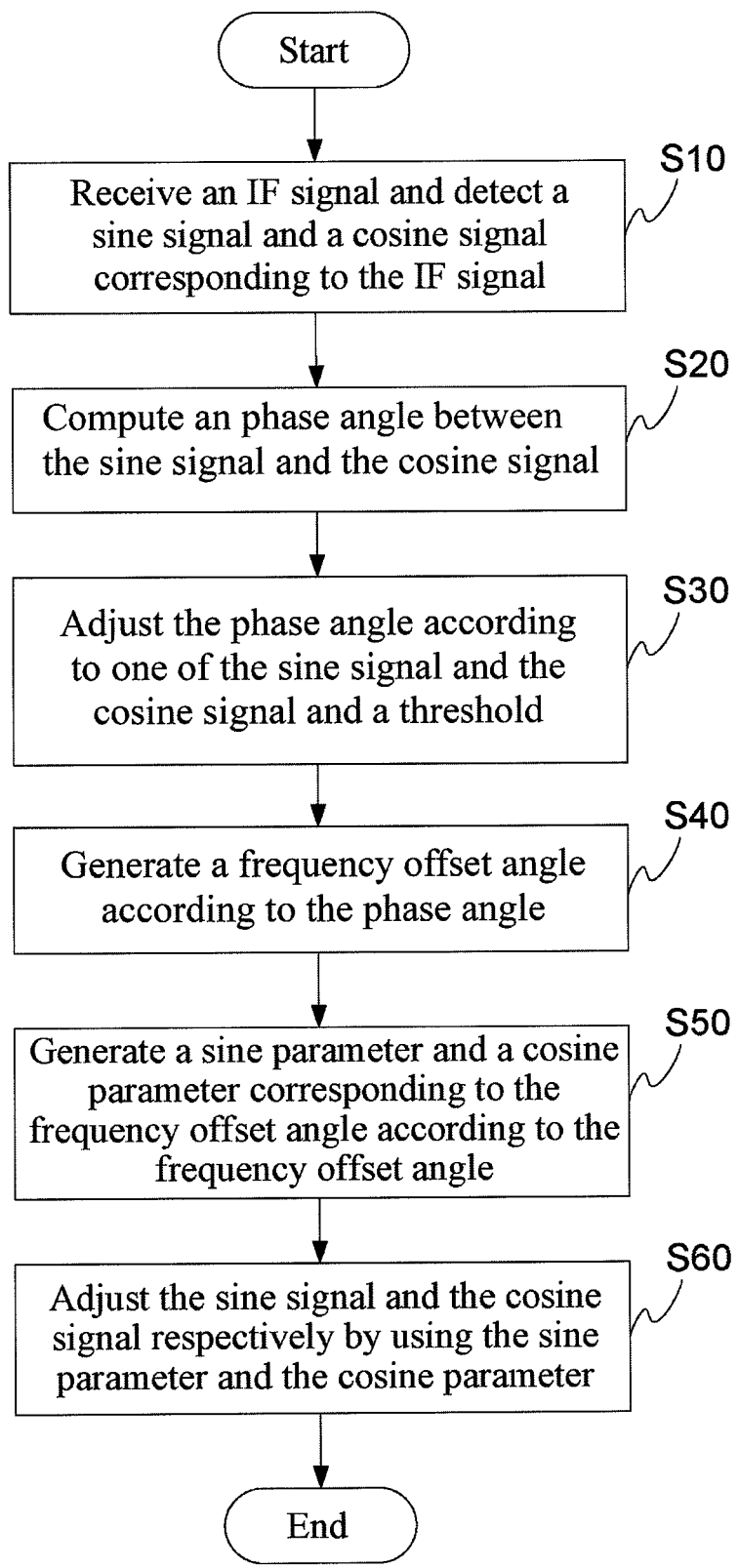
FIG. 4 is a flow chart of a carrier recovery method.

FIG. 4 is a flow chart of a carrier recovery method. Please refer to FIG. 4, in which the method includes the following steps.

In Step S10, an IF signal is received, and a sine signal and a cosine signal corresponding to the IF signal are detected.

In Step S20, a phase angle between the sine signal and the cosine signal is computed.

In Step S30, the phase angle is adjusted according to one of the sine signal and the cosine signal and a threshold.

In Step S40, a frequency offset angle is generated according to the phase angle.

In Step S50, a sine parameter and a cosine parameter corresponding to the frequency offset angle are generated according to the frequency offset angle. Here, the sine parameter and the cosine parameter may be generated according to a look up table.

In Step S60, the sine signal and the cosine signal are respectively adjusted by using the sine parameter and the cosine parameter.

The above Step S10 may include: multiplying the IF signal by the sine parameter to generate the sine signal; and multiplying the IF signal by the cosine parameter to generate the cosine signal.

Furthermore, the above Step S30 may include: comparing one of the sine signal and the cosine signal with the threshold;

and when one of the sine signal and the cosine signal is smaller than the threshold, reducing the phase angle. Alternatively, the Step S30 may include: computing a maximum value of one of the sine signal and the cosine signal; taking a reciprocal of the maximum value to serve as the threshold; and multiplying the threshold by the phase angle, which can additionally provide a weight for adjusting a weight value obtained after multiplying the threshold by the phase angle.

While the disclosure has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A carrier recovery device, comprising:
   a phase detection module, for receiving an input signal and detecting a sine signal and a cosine signal in the input signal according to a sine parameter and a cosine parameter;
   a computation module, coupled to the phase detection module, for computing a phase angle between the sine signal and the cosine signal;
   a phase angle adjustment module, coupled to the phase detection module and the computation module, for adjusting the phase angle according to at least one of the sine signal or the cosine signal and a threshold, and outputting an adjusted phase angle, wherein the phase angle adjustment module compares the at least one of the sine signal or the cosine signal with the threshold, and reduces the phase angle when the at least one of the sine signal or the cosine signal is smaller than the threshold;
   a loop filter, coupled to the phase angle adjustment module, for generating a frequency offset angle according to the adjusted phase angle; and
   a conversion module, coupled to the loop filter and the phase detection module, for generating the sine parameter and the cosine parameter to the phase detection module according to the frequency offset angle.

2. The carrier recovery device according to claim 1, wherein the phase detection module comprises: a first multiplier, for multiplying the input signal by the sine parameter to generate the sine signal; and a second multiplier, for multiplying the input signal by the cosine parameter to generate the cosine signal.

3. The carrier recovery device according to claim 1, wherein the computation module comprises a coordinate rotation digital computer (CORDIC).

4. The carrier recovery device according to claim 1, wherein the loop filter comprises a proportional integral (PI) controller.

5. The carrier recovery device according to claim 1, wherein the conversion module comprises a local oscillator.

6. The carrier recovery device according to claim 1, wherein the conversion module generates the sine parameter and the cosine parameter according to a look up table.

7. The carrier recovery device according to claim 1, wherein the input signal is an intermediate frequency (IF) signal.

8. A carrier recovery method, comprising:
   receiving an input signal, and detecting a sine signal and a cosine signal in the input signal according to a sine parameter and a cosine parameter;
   computing a phase angle between the sine signal and the cosine signal;
   adjusting the phase angle according to at least one of the sine signal or the cosine signal and a threshold, and outputting an adjusted phase angle,
   wherein the step of adjusting the phase angle comprises:
      comparing the at least one of the sine signal or the cosine signal with the threshold; and
      reducing the phase angle when the at least one of the sine signal or the cosine signal is smaller than the threshold;
   generating a frequency offset angle according to the adjusted phase angle; and
   generating the sine parameter and the cosine parameter according to the frequency offset angle, so as to adjust the sine signal and the cosine signal respectively.

9. The carrier recovery method according to claim 8, wherein the step of detecting the sine signal and the cosine signal comprises: multiplying the input signal by the sine parameter to generate the sine signal; and multiplying the input signal by the cosine parameter to generate the cosine signal.

10. The carrier recovery method according to claim 8, wherein the step of generating the sine parameter and the cosine parameter comprises: generating the sine parameter and the cosine parameter according to a look up table.

11. A carrier recovery device, comprising:
   a phase detection module, for receiving an input signal and detecting a sine signal and a cosine signal in the input signal according to a sine parameter and a cosine parameter;
   a computation module, coupled to the phase detection module, for computing a phase angle between the sine signal and the cosine signal;
   a phase angle adjustment module, coupled to the phase detection module and the computation module, for adjusting the phase angle according to at least one of the sine signal or the cosine signal and a threshold, and outputting an adjusted phase angle, wherein the phase angle adjustment module computes a maximum value of the at least one of the sine signal or the cosine signal, takes a reciprocal of the maximum value to serve as the threshold, and multiplies the threshold by the phase angle;
   a loop filter, coupled to the phase angle adjustment module, for generating a frequency offset angle according to the adjusted phase angle; and
   a conversion module, coupled to the loop filter and the phase detection module, for generating the sine parameter and the cosine parameter to the phase detection module according to the frequency offset angle.

12. The carrier recovery device according to claim 11, wherein the phase angle adjustment module provides a weight for adjusting a weight value obtained after multiplying the threshold by the phase angle.

13. The carrier recovery device according to claim 11, wherein the phase detection module comprises: a first multiplier, for multiplying the input signal by the sine parameter to generate the sine signal; and a second multiplier, for multiplying the input signal by the cosine parameter to generate the cosine signal.

14. The carrier recovery device according to claim 11, wherein the computation module comprises a coordinate rotation digital computer (CORDIC).

15. The carrier recovery device according to claim 11, wherein the loop filter comprises a proportional integral (PI) controller.

16. The carrier recovery device according to claim 11, wherein the conversion module comprises a local oscillator.

17. The carrier recovery device according to claim 11, wherein the conversion module generates the sine parameter and the cosine parameter according to a look up table.

18. The carrier recovery device according to claim 11, wherein the input signal is an intermediate frequency (IF) signal.

* * * * *